(12) United States Patent
Kawashima

(10) Patent No.: US 7,028,081 B2
(45) Date of Patent: Apr. 11, 2006

(54) NETWORK-DEVICE MANAGEMENT APPARATUS AND METHOD, RECORDING MEDIUM, AND TRANSMISSION APPARATUS

(75) Inventor: Masanori Kawashima, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,102

(22) Filed: Oct. 20, 1999

(65) Prior Publication Data

US 2003/0115314 A1    Jun. 19, 2003

(30) Foreign Application Priority Data

Oct. 21, 1998    (JP)    ................................ 10-299595

(51) Int. Cl.
G06F 15/173    (2006.01)

(52) U.S. Cl. ...................... 709/223; 709/224

(58) Field of Classification Search ................ 709/203, 709/223, 224, 220, 219, 200, 202, 206; 707/10, 707/3, 104; 714/4; 705/7, 76; 360/27; 713/500; 711/135; 379/93; 702/182, 186, 188; 600/419, 600/410; 701/120; 345/501; 368/10; 370/252, 370/48; 725/112, 134; 378/265; 340/825; 715/500

See application file for complete search history.

(56) References Cited

U.S. PATENT DOCUMENTS

| | | | |
|---|---|---|---|
| 4,574,354 A | * | 3/1986 | Mihalik et al. ............. 702/189 |
| 4,996,654 A | * | 2/1991 | Rosenow .................... 345/440 |
| 5,185,860 A | * | 2/1993 | Wu ............................. 709/224 |
| 5,371,842 A | * | 12/1994 | Easton et al. ................ 345/440 |
| 5,377,097 A | * | 12/1994 | Fuyama et al. ............... 705/15 |
| 5,379,153 A | * | 1/1995 | Ishii et al. .................... 360/27 |
| 5,483,468 A | * | 1/1996 | Chen et al. ................. 702/186 |
| 5,539,665 A | * | 7/1996 | Lamming et al. ........... 709/224 |
| 5,603,322 A | * | 2/1997 | Jesmanowicz et al. ...... 600/410 |
| 5,677,841 A | * | 10/1997 | Shiomi et al. .............. 701/120 |
| 5,684,988 A | * | 11/1997 | Pitchaikani et al. ..... 707/104.1 |
| 5,685,305 A | * | 11/1997 | Moonen et al. ............. 600/419 |
| 5,778,182 A | * | 7/1998 | Cathey et al. .............. 709/219 |
| 5,802,303 A | * | 9/1998 | Yamaguchi ................. 709/224 |
| 5,832,217 A | * | 11/1998 | Takahara et al. ............ 709/200 |
| 5,881,231 A | * | 3/1999 | Takagi et al. ............... 709/212 |
| 5,903,889 A | * | 5/1999 | De la Huerga et al. ......... 707/3 |

(Continued)

FOREIGN PATENT DOCUMENTS

JP    10-083405    3/1998

(Continued)

OTHER PUBLICATIONS

Allison et al, The World Wide Wait: Where Does the Time go ?, IEEE 1998.*

(Continued)

Primary Examiner—Thong Vu
(74) Attorney, Agent, or Firm—Fitzpatrick, Cella, Harper & Scinto.

(57) ABSTRACT

In a management system for managing network devices connected to a network, it is considered to reduce the load of the network and the devices by preserving device information acquired from each device and not acquiring new information from the device for a predetermined period. However, this approach has a problem in that the user cannot know when the displayed information was acquired. In the present invention, when preserving device information, the time of acquisition of the device information is preserved as acquisition-time data, which is displayed within displayed information together with the device information. The above-described probem is thereby solved, and the user can acquire very reliable information.

28 Claims, 14 Drawing Sheets

U.S. PATENT DOCUMENTS

| | | | | |
|---|---|---|---|---|
| 5,905,495 | A * | 5/1999 | Tanaka et al. | 726/14 |
| 5,909,184 | A * | 6/1999 | Tajima | 340/825.27 |
| 5,917,540 | A * | 6/1999 | Buch et al. | 348/86 |
| 5,940,494 | A * | 8/1999 | Rafacz et al. | 379/265.03 |
| 5,946,471 | A * | 8/1999 | Voorhees et al. | 703/23 |
| 5,966,509 | A * | 10/1999 | Abe et al. | 714/4 |
| 5,982,391 | A * | 11/1999 | Oki | 345/501 |
| 6,005,564 | A * | 12/1999 | Ahmad et al. | 715/723 |
| 6,012,096 | A * | 1/2000 | Link et al. | 709/233 |
| 6,014,612 | A * | 1/2000 | Larson et al. | 702/183 |
| 6,029,198 | A * | 2/2000 | Izuka | 709/223 |
| 6,038,295 | A * | 3/2000 | Mattes | 379/93.25 |
| 6,047,313 | A * | 4/2000 | Hashimoto et al. | 709/203 |
| 6,055,493 | A * | 4/2000 | Ries et al. | 702/186 |
| 6,070,190 | A * | 5/2000 | Reps et al. | 709/224 |
| 6,085,222 | A * | 7/2000 | Fujino et al. | 709/202 |
| 6,108,637 | A * | 8/2000 | Blumenau | 705/7 |
| 6,112,239 | A * | 8/2000 | Kenner et al. | 709/224 |
| 6,182,225 | B1 * | 1/2001 | Hagiuda et al. | 713/201 |
| 6,192,007 | B1 * | 2/2001 | Aoshima | 368/10 |
| 6,219,708 | B1 * | 4/2001 | Martenson | 709/226 |
| 6,223,347 | B1 * | 4/2001 | Watanabe et al. | 725/139 |
| 6,247,012 | B1 * | 6/2001 | Kitamura et al. | 707/10 |
| 6,263,507 | B1 * | 7/2001 | Ahmad et al. | 725/134 |
| 6,272,537 | B1 * | 8/2001 | Kekic et al. | 709/223 |
| 6,279,037 | B1 * | 8/2001 | Tams et al. | 709/224 |
| 6,285,966 | B1 * | 9/2001 | Brown et al. | 702/188 |
| 6,285,991 | B1 * | 9/2001 | Powar | 705/76 |
| 6,327,620 | B1 * | 12/2001 | Tams et al. | 709/224 |
| 6,339,750 | B1 * | 1/2002 | Hoyer et al. | 702/182 |
| 6,339,790 | B1 * | 1/2002 | Inoue | 709/224 |
| 6,385,644 | B1 * | 5/2002 | Devine et al. | 709/206 |
| 6,389,464 | B1 * | 5/2002 | Krishnamurthy et al. | 709/220 |
| 6,412,000 | B1 * | 6/2002 | Riddle et al. | 709/224 |
| 6,421,322 | B1 * | 7/2002 | Koziy et al. | 370/248 |
| 6,421,786 | B1 * | 7/2002 | Yoshihara | 713/500 |
| 6,430,612 | B1 * | 8/2002 | Iizuka | 709/223 |
| 6,430,613 | B1 * | 8/2002 | Brunet et al. | 709/223 |
| 6,470,386 | B1 * | 10/2002 | Combar et al. | 709/224 |
| 6,473,407 | B1 * | 10/2002 | Ditmer et al. | 370/252 |
| 6,487,543 | B1 * | 11/2002 | Ozaki et al. | 725/112 |
| 6,487,564 | B1 * | 11/2002 | Asai et al. | 715/500.1 |
| 6,490,657 | B1 * | 12/2002 | Masubuchi et al. | 711/135 |
| 6,498,783 | B1 * | 12/2002 | Lin | 370/252 |
| 6,505,247 | B1 * | 1/2003 | Steger et al. | 709/224 |
| 2003/0061322 | A1 * | 3/2003 | Igarashi et al. | 709/223 |

FOREIGN PATENT DOCUMENTS

| | | |
|---|---|---|
| JP | 10-187765 | 7/1998 |
| JP | 10-254732 | 9/1998 |

OTHER PUBLICATIONS

Grrison, Publishing a Document Set Simultaneously on Paper, CD-ROM, and the Web, IEEE 1196.*

Creating and Rendering Image-Based Visual Hulls—Buehler, Matusik, McMillan.. (1999); www.lcs.mit.edu/publications/pubs/ps/MIT-LCS-TR-780.ps.gz.*

Motion and Structure from Time-Varying Optical Flow—Barron, Eagleson (1995); www.csd.uwo.ca/faculty/barron/PAPERS/VI95paper2.ps.*

Specific DSP based monitoring system for hydro-generator sets—Jess Ibez Carlos (1998); gtas.dicom.unican.es/comp/Nacho/Publicaciones/Congresos/lcspat98_1.pdf.*

Interactive Generator of Virtual Baroque Dances..—Alberti, Bertolo, .. aos2.uniba.it:8080/napoli/bertolo.ps.*

Communication Requirements and Technologies for Multi-Agent..—Mountzia, Benech (1997) □□www.irit.fr/%7EDominique.Benech/docs/dsom97p.ps.*

Divide and Conquer in Network Management Using Event-Driven..—Kooijman (1995) □□snmp.cs.utwente.nl/bibliography/articles/general/koo9505.ps.*

Proactive Network Fault Detection—Hood, Ji (1997) □□www.ecse.rpi.edu/Homepages/chuanyi/ieeere.ps.*

Interactive Generator of Virtual Baroque Dances..—Alberti, Bertolo, .. aos2.uniba.it:8080/napoli/bertolo.ps.*

Creating and Rendering Image-Based Visual Hulls—Buehler, Matusik, McMillan.. (1999) www.lcs.mit.edu/publications/pubs/ps/MIT-LCS-TR-780.ps.gz.*

A Distributed Real-Time MPEG Video Audio Player—Shanwei Cen (1995) hulk.bu.edu/nossdav95/../nossdav95/papers/CEN_Shanwei.ps.*

* cited by examiner

NETWORK-DEVICE MANAGEMENT APPARATUS AND METHOD, RECORDING MEDIUM, AND TRANSMISSION APPARATUS

BACKGROUND OF THE INVENTION

1. Field of the Invention

The present invention relates to a computer network, and more particularly, to a network-device management apparatus and method relating to a network-device management program for controlling network devices connected to a computer network.

2. Description of the Related Art

Today, computers are often interconnected via a local area network (LAN). The local area network is constructed in a floor or the entirety of a building, a group of buildings (an enclosure), a local area, or a larger area. It is also possible to interconnect such networks, and connect the networks to a worldwide network. Each of such interconnected LANs has, in some cases, various hardware interconnecting techniques and a plurality of network protocols.

In a simple LAN isolated from other LANs, each user can exchange an apparatus, install software, or examine problems.

On the other hand, in a large-scale complicated LAN or a large group of interconnected LANs, "management" is required. The word "management" indicates management by both a network device manager (a human being), and software used by that manager.

In the present invention, the word "management" indicates management by software (a network-device management program) for managing the entire system, and the word "user" indicates a human being who uses the network-device management program. Usually, the user is a network-device manager or a person responsible for system management. By using a network-device management program, the user can obtain management data from each network device and change the management data.

Usually, a large-scale network system is a dynamic system in which addition or removal of an apparatus, updating of software, detection of problems, and the like are incessantly performed. A description will now be provided of a large-scale network which requires "management".

FIG. 1 is a diagram illustrating a large-scale network. Usually, a printer 102 having an open architecture is connected to a network via a network board (NB) 101. The NB 101 is connected to a LAN 100 via a LAN interface, such as an Ethernet interface 10Base-2 having a coaxial connector, or 10Base-T having RJ-45, or the like.

A plurality of personal computers (PCs), such as a PC 103, a PC 104 and the like, are also connected to the LAN 100. These PC 103, PC 204 and the like can communicate with the NB 101 under the control of a network operating device. The user can use the PC103 as a PC for managing network devices. A local printer 105 is connected to the PC104. Similarly, a local printer, such as the printer 105 or the like, may be connected to the PC103, although such is not shown in FIG. 1.

A file server 106 is also connected to the LAN 100. The file server 106 manages access to a file stored in a large-capacity (for example, ten billion bytes) network disk 107. A print server 108 manages printing requests to a plurality of printers 109, the printer 105 installed at a remote location, and the like. Any other peripheral apparatus (not shown) may also be connected to the LAN 100.

A WWW (world wide web) server 150 is also connected to the LAN 100. The WWW server 150 transmits an HTML (Hyper Text Markup Language) document generated by an installed network-device management program to the PC 103, which can display the HTML document on a display by means of an installed WWW browser. Alternatively, when the user performs setting of a printer using the WWW browser in the PC 103, the PC 103 can transmit the contents of the setting to a specific printer via the network-device management program of the WWW server 150.

More specifically, in the network shown in FIG. 1, in order to perform efficient communication between various network members, network software, such as Novell®, NetWare®, UNIX® or the like, may be used. Although any network software may be used, NetWare (a registered trademark of the Novell Corporation; hereinafter omitted) software is an example of software that is fully suited for this use. For more detailed description relating to this software package, refer to the on-line documentation enclosed in the NetWare package). This documentation can be purchased from the Novell Corporation together with the NetWare package.

FIG. 1 will now be briefly described. The file server 106 operates as a file management unit, and performs reception, storage, queuing, caching, and transmission of files. For example, data files formed by each of the PC 103 and PC 104 are transmitted to the file server 106. The file server 106 sequentially arranges these data files and performs queuing, and sequentially transmits the data files to a printer 109 in accordance with a command from the print server 108.

Each of the PC 103 and PC 104 is an ordinary PC which can perform generation of a data file, transmission of the generated data file to the LAN 100, reception of files from the LAN 100, and display and/or processing of the received files.

Although only PCs are illustrated in FIG. 1, any other computers which are suitable for executing network software may also be connected to the network. For example, when UNIX software is used, UNIX workstations may be connected to the network. Such workstations may be used together with the illustrated PCs in an appropriate situation.

Usually, the LAN provides a relatively local user group, for example, a user group on a single floor or on a plurality of consecutive floors within a building with service. As the distance between users increases, for example, when users are located in different buildings or prefectures, a wide-area network (WAN) may be constructed. A WAN is basically an aggregate of LANs formed by interconnecting various LANs with a high-speed digital network, such as ISDN (Integrated Services Digital Network) or the like. Accordingly, as shown in FIG. 1, a WAN is formed by interconnecting the LAN 100, a LAN 110 and a LAN 120 via modem/transponders 130, 130b and a backbone 140.

Dedicated PCs, and if necessary, a file server and a print server, are connected to each of the LANs. As shown in FIG. 1, a PC 111, a PC 112, a file server 113, a network disk 114, a print server 115 and a number of printers 116 are connected to the LAN 110. On the other hand, only a PC 121 and a PC 122 are connected to the LAN 120. The devices connected to the LAN 100, the LAN 110 and the LAN 120 can access the functions of apparatuses connected to other LANs via the WAN connection.

In order to manage devices connected to networks constituting such a large-scale network system, various attempts have been made by a large number of standardization organizations. The International Organization for Standardization (ISO) has provided a general-purpose standard framework called an Open System Interconnection (OSI) model. The OSI model of a network-device control protocol is called a Common Management Information Protocol (CMIP). The CMIP is a network-device control protocol common in Europe.

Recently, a modification of the CMIP, called a Simple Network Management Protocol (SNMP), has been used as a network-device management protocol capable of being more commonly used (see the first edition, Aug. 20, 1992, of "Introduction to TCP/IP Network-Device Management: Aiming at Practical Management" written by M. T. Rose, translated by Takeshi Nishida, published by Toppan Printing Company, Limited).

A network-device management system according to this SNMP network-device management technique includes at least one network-device management station (NMS), a plurality of nodes to be managed, each including an agent, and a network-device management protocol to be used by the network-device management station and the agent for exchanging management information. Usually, the user can obtain data on the network or change the data by communicating with agent software on a node to be managed using a network-device management program in the NMS.

The word "agent" indicates software running at each node to be managed as a background process. When the user requests management data to a device on the network, the network-device management program puts object identifying information in a management packet or frame, and transmits the packet or frame to the agent of the device. The agent interprets the object identifying information, puts data corresponding to the object identifying information in a packet, and transmits the packet to the network-device management program. The agent calls, in some cases, a corresponding process in order to extract data.

The agent holds management data relating to the state of the device in the form of a database. This database is called an MIB (management information base). The MIB has the data structure of a tree, in which all nodes are uniquely numbered. An identifier for each of the nodes is called an object identifier.

The structure of the MIB is called a Structure of Management Information (SMI), which is provided in "RFC1155 Structure and Identification of Management Information for TCP/IP-Based Internets".

In this specification, management data for a network device is equivalent to information allocated to the MIB object identifier (MIB information).

Next, the SNMP will be briefly described. Communication is performed between a PC (manager) where the network-device management program operates and a network device (agent) to be managed where an SNMP agent operates using the SNMP. The SNMP has five types of commands, i.e., Get-request, Get-next-request, Get-response, Set-request, and Trap.

Get-request and Get-next-request commands are commands to be transmitted from the manager to the agent in order for the manager to acquire the value of the MIB object (MIB information) of the agent. The agent which has received this command transmits a Get-response command in order to notify the manager of the value of the MIB object.

A Set-request command is a command transmitted from the manager to the agent in order for the manager to set the value of the MIB object of the agent. The agent which has received this command sets the value of the MIB object, and transmits a Get-response command to the manager in order to notify the manager of the result of the setting.

A Trap command is a command transmitted from the agent to the manager in order to notify the manager of a change in the state of the agent's own device.

A system is well known in which the SNMP agent operates in the printer itself or the network board (NB 101) connected to the printer, and the network-device management program, serving as the SNMP manager, operates in the PC.

SUMMARY OF THE INVENTION

In accordance with recent spread of use of the Internet, a system has been proposed in which a dedicated network-device management program operates in a server, and a WWW browser is used as a user interface. An outline of the operation of an ordinary WWW system and the operation of an SNMP management program based on the WWW system will now be described with reference to FIG. 2.

In FIG. 2, a WWW server program 1501 operates in a PC 150. A large number of WWW page data (WWW documents or templates for generating respective WWW documents) described using the HTML are stored on a hard disk of the PC 150.

In order to display a page assigned by the user, a WWW browser program 1031 requests the WWW server program 1501 operating in the PC 150 to acquire page data of the assigned page.

The WWW server program 1501 transmits the assigned page data in response to the request from the WWW browser program 1031. The WWW browser program 1031 analyzes the acquired page data and displays the page based on the description.

When a request using a CGI (Common Gateway Interface) is included within the request to acquire the page data from the WWW browser program 1031, the WWW server program 1501 starts an external script or program using the CGI. The WWW server program 1501 then acquires page data generated by the external script or program, and transmits the acquired data to the WWW browser program 1031.

Next, a description will be provided of a case in which the external program started by the CGI is a network-device management program.

A network-device management program 1502 started by the WWW server program 1501 using the CGI acquires management data from a device connected to the network, for example, a printer 102, using the SNMP. The network-device management program 1502 generates page data described by the HTML (hereinafter termed an "HTML document") based on the acquired management data, and transmits the generated data to the WWW server program 1501.

FIGS. 9 and 10 illustrate examples of display of HTML documents generated by the network-device management program 1502. FIG. 9 is an example of display of a device list in which a summary of network devices connected to the network is displayed. In this example, MIB information, including the device name, the product name, the network interface board name, the network address and the state, is acquired from each network device connected to the network, and the acquired information is displayed.

FIG. 10 is an example of display of the details of each device performed when the user has selected a specific device in the display shown in FIG. 9, in order to display further details of the selected device. In the case of FIG. 10, the state of the network device (printer), the status of mounting of optional devices, the states of sheet feeding and discharging units, and the like are acquired as MIB information, and display is performed based on the acquired MIB information.

If the network-device management program 1502 utilizing the WWW system acquires management data from a network device every time a request to display MIB information is provided from the WWW browser program 1031, too much time is required from the request of display to display of management data. Accordingly, the network-device managment program 1502 preserves management data acquired from a device to be managed in a memory (RAM (random access memory)) or a hard disk (HD) in a local PC (a device storing data, such as a RAM, a HD or the like, will be hereinafter termed a "cache", and data stored therein will be hereinafter termed a "cache file"). Instead of newly acquiring management data from a device to be managed, the network-device management program 1502 generates an HTML document using management data preserved in the cache for a specific period from the acquisition of the management data.

In this approach, a problem arises in that the user cannot know when management data displayed on the WWW browser as shown in FIG. 9 or 10 which has been acquired from a network device by the network-device management program that uses the cache was acquired from the network device.

For example, even if management data obtained by the user by starting the WWW browser is management data which has been just displayed on the WWW browser via the network-device management program of the WWW server (the user feels as if the displayed data is information newly acquired from the network device), there is the possibility that the displayed data is actually old management data acquired from the network device by the network-device control program a few hours before, based on a request from another WWW browser.

To the contrary, even if information displayed on the WWW browser is information just now acquired from the network device by the network-device management program based on a request from the WWW browser, the user cannot know if the management data in the network device coincides with the management data displayed on the WWW browser (i.e., if the very latest information is displayed). Accordingly, there arises a problem in that the user may unnecessarily provide a command to "update to latest information" (the user can instruct the network-device management program to generate an HTML document by newly acquiring management data by depressing a button 903 shown in FIG. 9 or a button 1003 shown in FIG. 10, instead of merely reaquiring the HTML document), thereby increasing the load on the network-device management program operating in the WWW server beyond what is necessary.

It is an object of the present invention to provide a network-device management apparatus and method using a cache represented by a network-device management program in a WWW system or the like, in which the above-described problems are solved.

According to one aspect of the present invention, a network-device management method for managing network devices connected to a network includes an acquisition step, of acquiring device information relating to a network device, a time acquisition step, of acquiring time data substantially indicating a time of acquisition of the device information, and a conversion step, of converting the device information and the time data into a form conforming to a predetermined display format.

According to another aspect of the present invention, in a method for controlling a network-device management system including a network-device management apparatus for managing network devices connected to a network, and an information processing apparatus capable of displaying device information relating to a network device managed by the network-device management apparatus, a method for controlling the network-device management apparatus includes a reception step, of receiving a command from the information processing apparatus, an acquisition step of acquiring the device information, a time acquisition step, of acquiring time data substantially indicating a time of acquisition of the device information, a conversion step, of converting the device information and the time data into a form conforming to a predetermined display format, and a transmission step, of transmitting the device information and the time data to the image processing apparatus in the form after being converted in the conversion step. A method for controlling the image processing apparatus includes a command transmission step of transmitting the command to the network-device management apparatus, and an information reception step, of receiving the device information and the time data in the converted form.

According to still another aspect of the present invention, a network-device management apparatus for managing network devices connected to a network includes acquisition means for acquiring device information relating to a network device, time acquisition means for acquiring time data substantially indicating a time of acquisition of the device information, and conversion means for converting the device information and the time data into a form conforming to a predetermined display format.

According to yet another aspect of the present invention, in a network-device management system including a network-device management apparatus for managing network devices connected to a network, and an information processing apparatus capable of displaying device information relating to a network device managed by the network-device management apparatus, the network-device management apparatus includes reception means for receiving a command from the information processing apparatus, acquisition means for acquiring the device information, time acquisition means for acquiring time data substantially indicating a time of acquisition of the device information, conversion means for converting the device information and the time data into a form conforming to a predetermined display format, and transmission means for transmitting the device information and the time data to the image processing apparatus in the form after being converted by the conversion means. The image processing apparatus includes command transmission means for transmitting the command to the network-device management apparatus, and information reception means for receiving the device information and the time data in the form after being converted.

According to yet a further aspect of the present invention, in a recording medium storing a network-device management program for managing network devices connected to a network, the network-device management program includes an acquisition step, of acquiring device information relating to a network device, a time acquisition step, of acquiring time data substantially indicating a time of acquisition of the device information, and a conversion step, of converting the device information and the time data into a form conforming to a predetermined display format.

According to still another aspect of the present invention, in a recording medium storing programs for a network-device management system including a network-device management apparatus for managing network devices connected to a network, and an information processing apparatus capable of displaying device information relating to a network device managed by the network-device management apparatus, a program in the network-device management apparatus includes a reception step, of receiving a command from the information processing apparatus, an acquisition step, of acquiring the device information, a time acquisition step, of acquiring time data substantially indicating a time of acquisition of the device information, a conversion step, of converting the device information and the time data into a form conforming to a predetermined display format, and a transmission step, of transmitting the device information and the time data to the image processing apparatus in the form after being converted in the conversion step. A program in the image processing apparatus includes a command transmission step, of transmitting the command to the network-device management apparatus, and an information reception step, of receiving the device information and the time data in the converted form.

According to still another aspect of the present invention, in a transmission apparatus for transmitting a network-device management program for managing network devices connected to a network, the network-device management program includes an acquisition step, of acquiring device information relating to a network device, a time acquisition step, of acquiring time data substantially indicating a time of acquisition of the device information, and a conversion step, of converting the device information and the time data into a form conforming to a predetermined display format.

According to still another aspect of the present invention, in a transmission apparatus for transmitting programs for a network-device management system including a network-device management apparatus for managing network devices connected to a network, and an information processing apparatus capable of displaying device information relating to a network device managed by the network-device management apparatus, a program in the network-device management apparatus includes a reception step of receiving a command from the information processing apparatus, an acquisition step, of acquiring the device information, a time acquisition step, of acquiring time data substantially indicating a time of acquisition of the device information, a conversion step, of converting the device information and the time data into a form conforming to a predetermined display format, and a transmission step, of transmitting the device information and the time data to the image processing apparatus in the form after being converted in the conversion step. A program in the image processing apparatus includes a command transmission step of transmitting the command to the network-device management apparatus, and an information reception step, of receiving the device information and the time data in the converted form.

The foregoing and other objects, advantages and features of the present invention will become more apparent from the following description of the preferred embodiment taken in conjunction with the accompanying drawings.

DESCRIPTION OF THE PREFERRED EMBODIMENT

A network-device management method according to an embodiment of the present invention will now be described. Particularly, a description will be provided of a network-device management method using a WWW system with reference to the drawings.

Figure 3:
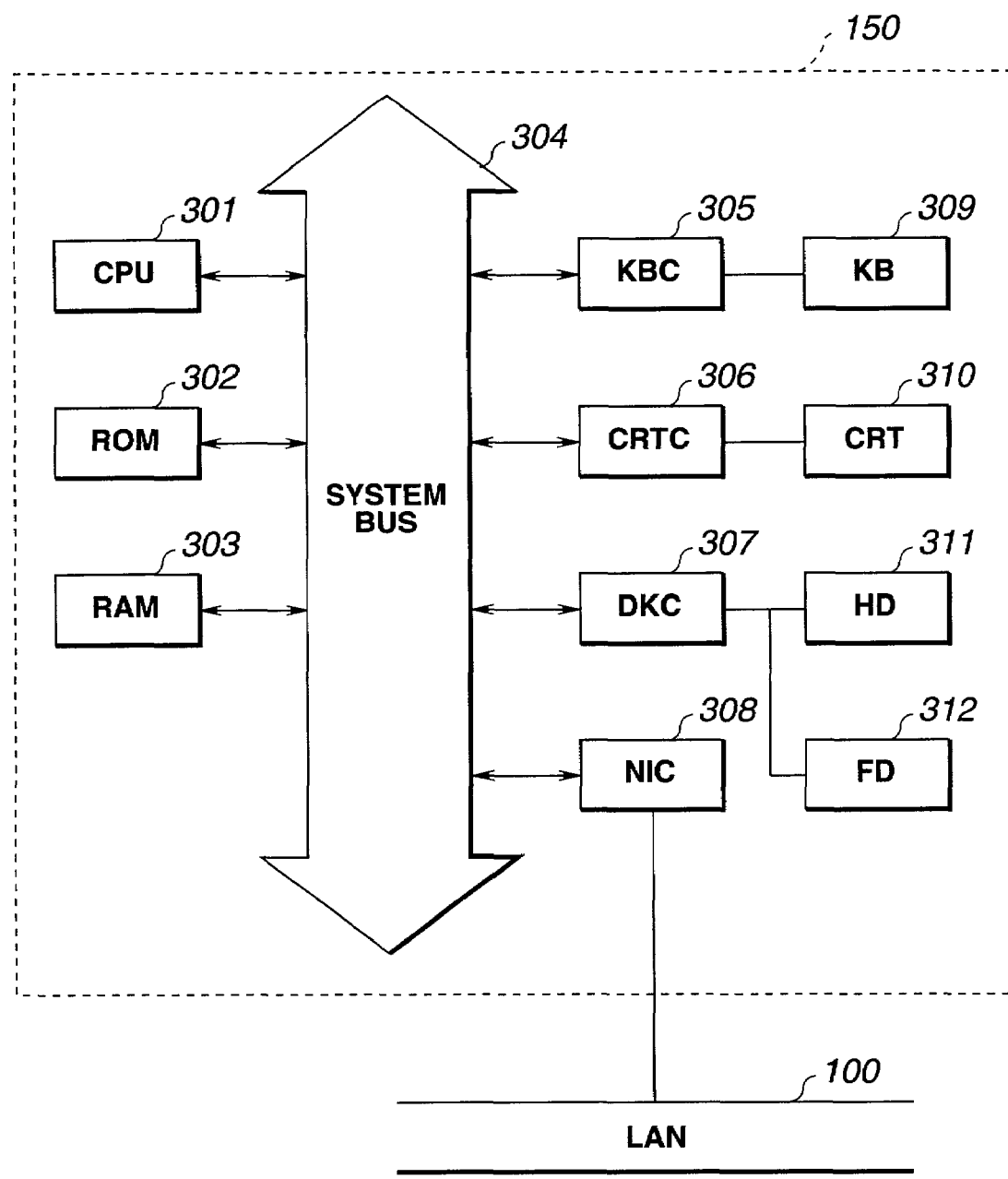
FIG. 3 is a block diagram illustrating the configuration of a PC, in which a network-device management program can operate, according to an embodiment of the present invention.

A network-device management method or apparatus according to the present invention is realized by PCs having the same configuration as PCs which can realize a conventional network-device management apparatus, as shown in FIG. 3.

Figure 1:
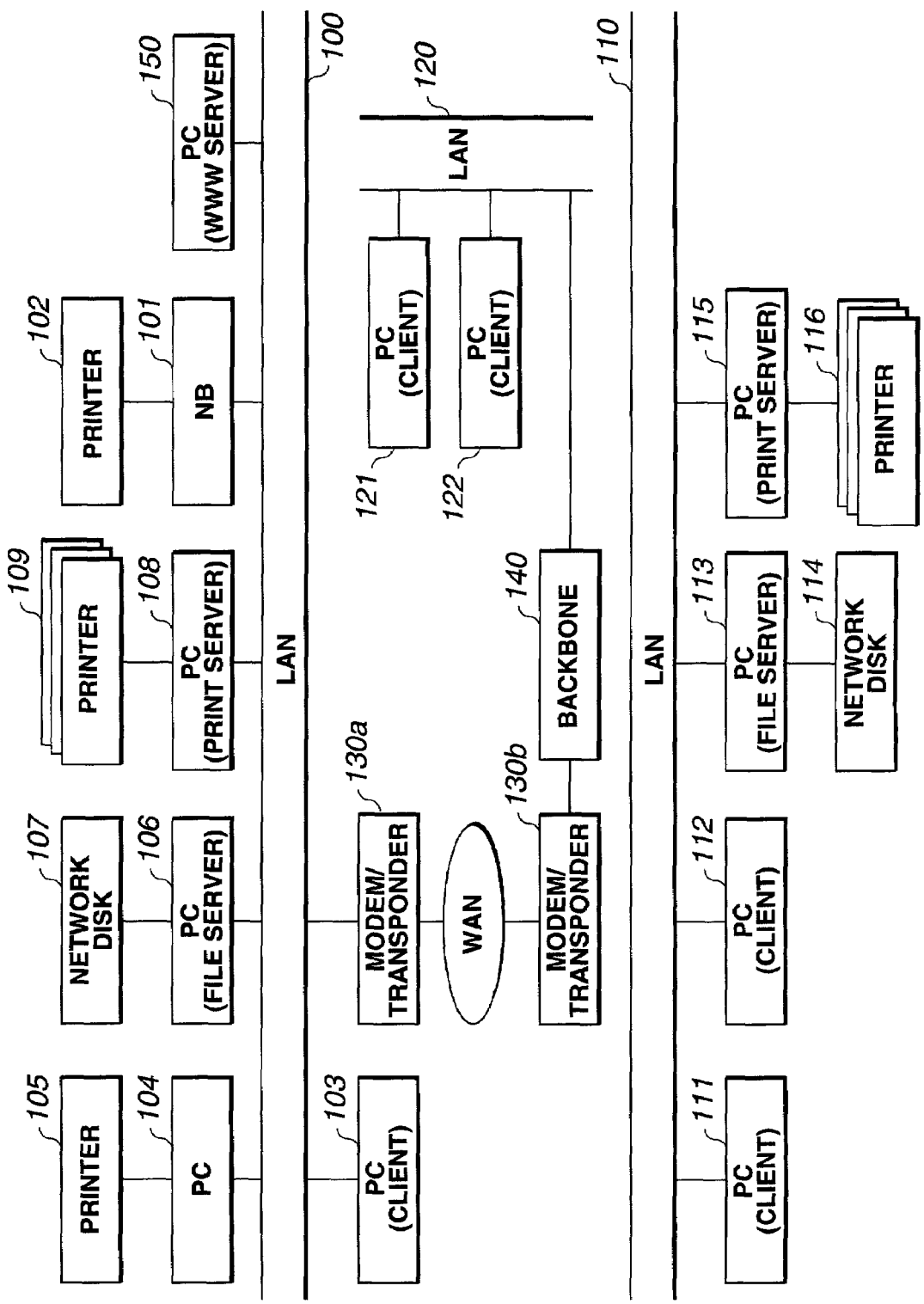
FIG. 1 is a block diagram illustrating the configuration of a LAN.
Figure 2:
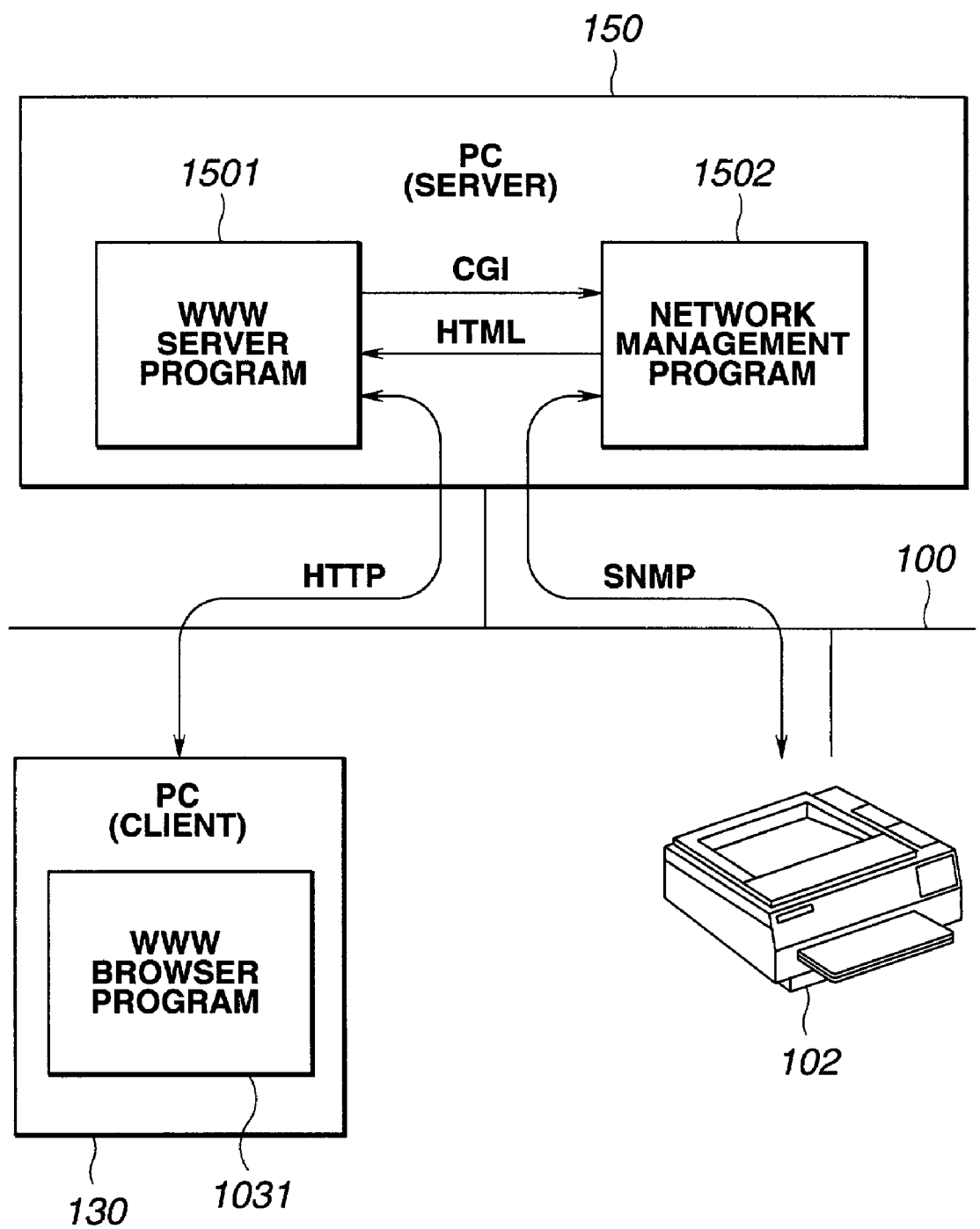
FIG. 2 is a block diagram illustrating an outline of the operation of an ordinary WWW system and the operation of a network-device management program based on the WWW system.

In FIG. 3, a network-device management program operates in a PC 150, which is equivalent to the PC 150 shown in FIG. 1. A CPU (central processing unit) 301 executes a network-device management program stored in a storage medium, such as a ROM (read-only memory) 302, a hard disk (HD) 311, a floppy disk (FD) 312 or the like, and controls respective devices connected to a system bus 304.

A RAM 303 operates as a main memory, a working area or the like for the CPU 301. A keyboard controller (KBC) 305 controls input from a keyboard (KB) 309 or a pointing device (not shown). A CRT (cathode-ray tube) controller (CRTC) 306 controls display on a CRT display (CRT) 310. A disk controller (DKC) controls access to the hard disk (HD) 311 and the floppy disk (FD) 312 storing boot programs, various application programs, editing files, user files, the network-device management program and the like. A network interface card (NIC) 308 performs two-way data exchange with an agent or a network device via a LAN 100.

In the following description, unless otherwise mentioned, the subject of execution in hardware is the CPU 3012, and the subject of execution in software is the network-device management program stored in the hard disk (HD) 311.

In FIG. 1, a combination, for example, of the network board (NB) 101 connected to the network and the printer 102 where the network board 101 is mounted is termed a network device.

Figure 4:
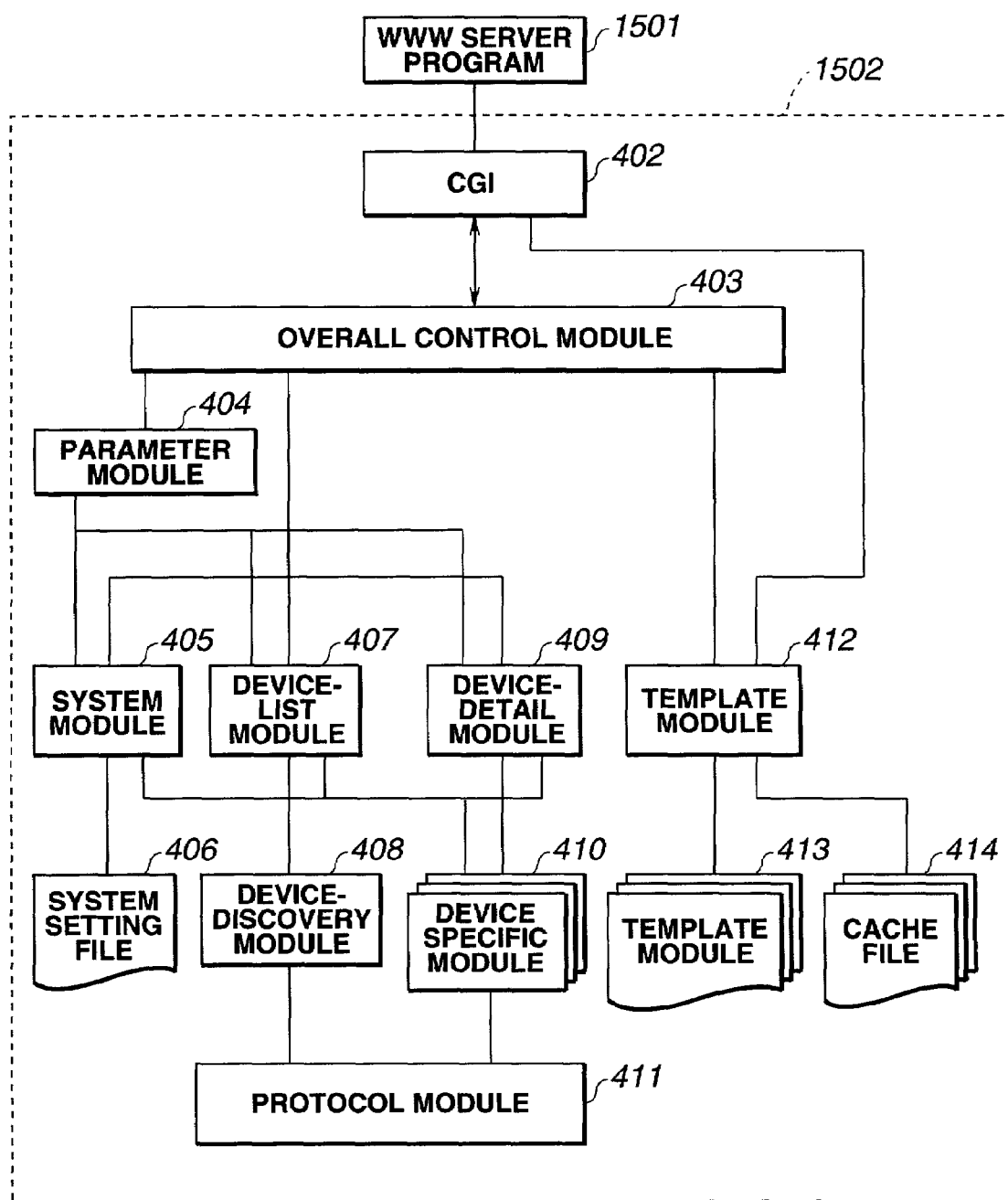
FIG. 4 is a block diagram illustrating the configuration of each module of a network-device management program according to that embodiment.

FIG. 4 is a diagram illustrating the configuration of each module of a network-device management program 1502 of the embodiment. The network-device management program 1502 of the embodiment is stored in the HD 311 shown in FIG. 3, and is executed by the CPU 301. At that time, the CPU 301 uses the RAM 303 as a working area.

In FIG. 4, the network-device management program 1502 is started from a WWW server program 1501, and exchanges CGI parameters and HTML documents with the WWW server program 1501 via a CGI (common gateway interface) 402.

An overall control module 403 registers a CGI parameter for a parameter module (to be described later), and then allocates control to one of a system module 405, a device-list module 407 and a device-detail module 409 (to be described later) in accordance with a command parameter within the CGI parameter.

If there is an error in the CGI parameter, the overall control module 403 generates, in some cases, an HTML document indicating the presence of error in the CGI parameter via a template module 412 (to be described later).

A parameter module 404 preserves/manages CGI parameters registered by the overall control module 403 in the form of a table. Any other module can acquire a desired parameter from the parameter module 404 whenever necessary.

The system module 405 controls display/setting of system parameters for defining the operation of the network-device management program 1502 (such as the interval of automatic updating of an HTML document, and the like), and generates a related HTML document via the template module 412.

The system module 405 acquires a command parameter from the parameter module 404. When the contents of the acquired command parameter indicate a request to display a system parameter, the system module 405 reads necessary information from a system setting file 406, and generates and HTML document for system parameter display via the template module 412. When the contents of the acquired command parameter indicate a request to set a system parameter, the system module 405 writes the notified system parameter in the system setting file 406, and generates an HTML document to be displayed after setting via the template module 412.

Although not illustrated in FIG. 4, a system parameter preserved in the system setting file 406 can be read by each module constituting the network-device management program 1502, whenever necessary.

The device-list module 407 generates an HTML document indicating a summary of devices (device list) retrieved by a device-discovery module 408 (to be described below) via the template module 412. Processing of optional display of the device list, and the like are also controlled by the device-list module 407.

A device-discovery module 408 discovers a network device connected to the network.

The device-detail module 409 performs control for displaying/setting detailed information relating to a specific network device assigned by a CGI parameter, and generates a related HTML document via the template module 412. In order to acquire/set detailed information relating to the assigned device, the device-detail module 409 uses a device specific module 410 (to be described below) corresponding to the assigned network device.

A device specific module 410 is provided for each device (a printer, a network interface board or the like) to be managed by the network-device management program. When displaying device-detail information, the device specific module 410 acquires necessary information from the device, and provides the template module 412 with the acquired information. When setting a setting value for the network device, the device specific module 410 converts the setting value notified in a CGI parameter into a value capable of being interpreted by the network device, and transmits the obtained value to the device.

A protocol module 411 performs control of various protocols necessary for the network-device management program to communicate with the network device, such as handling of MIB, transmission/reception of an SNMP packet, control of a transport protocol, and the like.

The template module 412 generates an HTML module as a result of output of the network-device management program, based on a template file 413 preserved in the hard disk 311 shown in FIG. 3.

The template module 412 opens a template file assigned by a CGI parameter, the entire control module 403, the system module 405, the device-list module 407 or the device-detail module 409, and analyzes the contents of the template file. The template module 412 also generates an HTML document by replacing a template variable contained in the template file by a value transmitted from the entire control module 403, the system module 405, the device-list module 407, the device-detail module 409 or the device specific module 410, whenever necessary. The generated HTML document is transmitted to the WWW server program via the CGI interface 402.

The value of the template variable used when generating the HTML document or the generated HTML document file can also be preserved on the hard disk 311 shown in FIG. 3 as a cache file 414. Thus, processing time when generating an HTML document at the second or later time based on the same template file is shortened.

Figure 5:
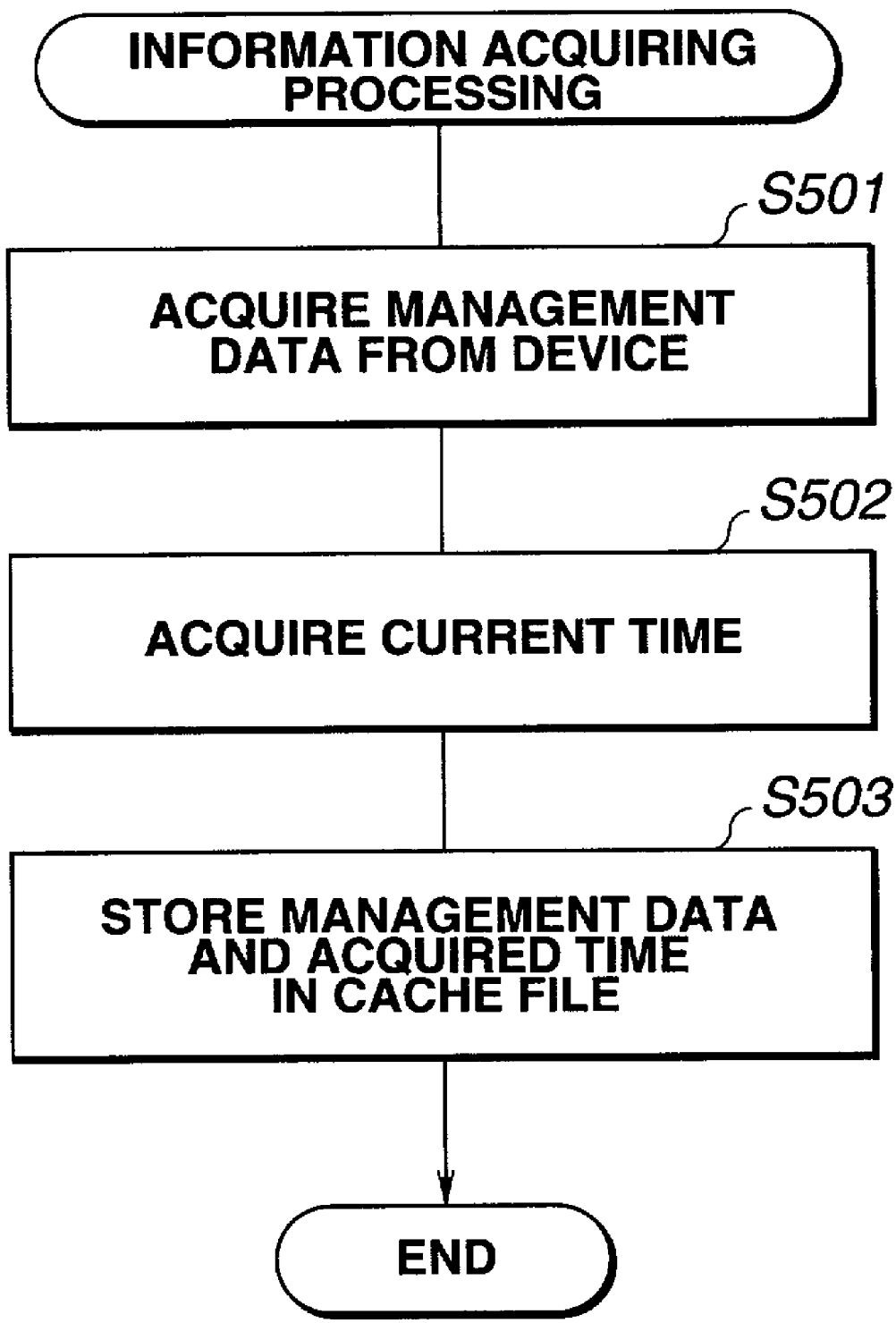
FIG. 5 is a flowchart illustrating processing of acquiring management data from a network device in that embodiment.
Figure 6:
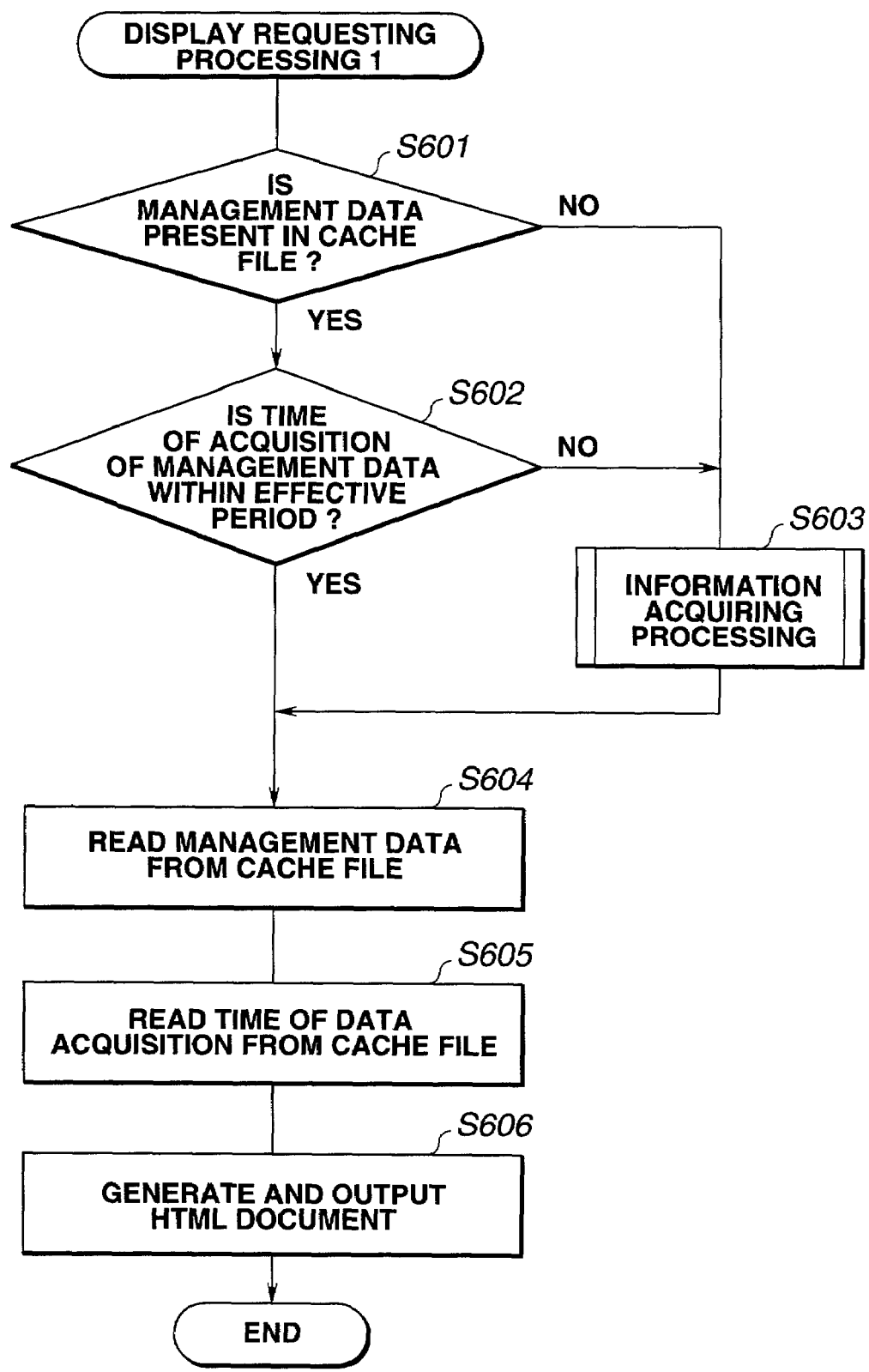
FIG. 6 is a flowchart for a case in which management data is preserved in a form before being converted into information for display when generating the information for display in response to a request from a client, in that embodiment.

Next, a description will be provided of the processing of the network-device management program when preserving the template variable or the management data used when generating the HTML document on the hard disk 311 as a cache file, with reference to FIGS. 5 and 6. FIG. 5 is a flowchart illustrating the processing of acquisition of management data from a network device by the network-device management program.

In step S501, Get-request and Get-next-request commands are transmitted to the concerned network device. By receiving a Get-response command, management data of the network device is acquired via the network.

Although not illustrated in FIG. 5, when a Get-response command expected for the Get-request and Get-next-request commands could not be received, appropriate error recovery processing, for example, retransmission of commands, is, of course, performed. Usually, a network device is assigned in the form of a network address or the like as a CGI parameter.

In step S502, system-time data (time of acquisition of management data) of the WWW server when the processing of the above-described step S501 has been completed is acquired.

In step S503, the management data acquired in the above-described step S501 and the management-data acquisition time acquired in the above-described step S502 are preserved as the cache file 414 shown in FIG. 4. It is assumed that the contents of the cache file 414 are preserved and can be referred to for each type of request from the WWW browser.

FIG. 6 is a flowchart illustrating the processing of generating an HTML document for displaying network-device management data in accordance with a request from the WWW browser by the network-device management program of the embodiment.

In step S601, it is determined if management data corresponding to the request for display (management data necessary for a page requested to be displayed) is present in the cache file. If the result of the determination in step S601 is affirmative, the process proceeds to step s602. If the result of the determination in step S601 is negative, the process proceeds to step S603.

In step S602, aquisition-time data of management data corresponding to the request for display within the cache file is compared with the system time (the current time) of the WWW server. When the management data is acquired within a specific period before the current time, i.e., relatively new information, the process proceeds to step S604. When the management data is not acquired within the specific period, i.e., old information, the process proceeds to step S603.

The specific period, i.e., an effective period for data preserved in the cache file 414, may be determined so as to be inherent in the system of the network-device management program, or may be set by the user, for example, according to a system setting page of the network-device management program.

In step S603, the processing of acquiring information relating to the requested management data shown in FIG. 5 is executed.

In step S604, the requested management data is read from the cache file 414.

In step S605, data relating to the acquisition time of the requested management data in the cache file 414 is read, and the process proceeds to step S606.

In step S606, the management data read in the above-described step S604 and the acquisition-time data read in the above-described step S605 are converted into a form capable of being displayed on the WWW browser (for example, an HTML document), and an HTML document is generated and output.

In the flowcharts shown in FIGS. 5 and 6, after newly acquiring the management data and the acquisition-time data in the information acquisition processing, the acquired data is prevserved in the cache, and the preserved data is then read to form an HTML document. However, after generating an HTML document from the newly acquired data (the management data and the acquisition-time data), the acquired data (the management data and the acquisition-time data) may be preserved in the cache.

Figure 7:
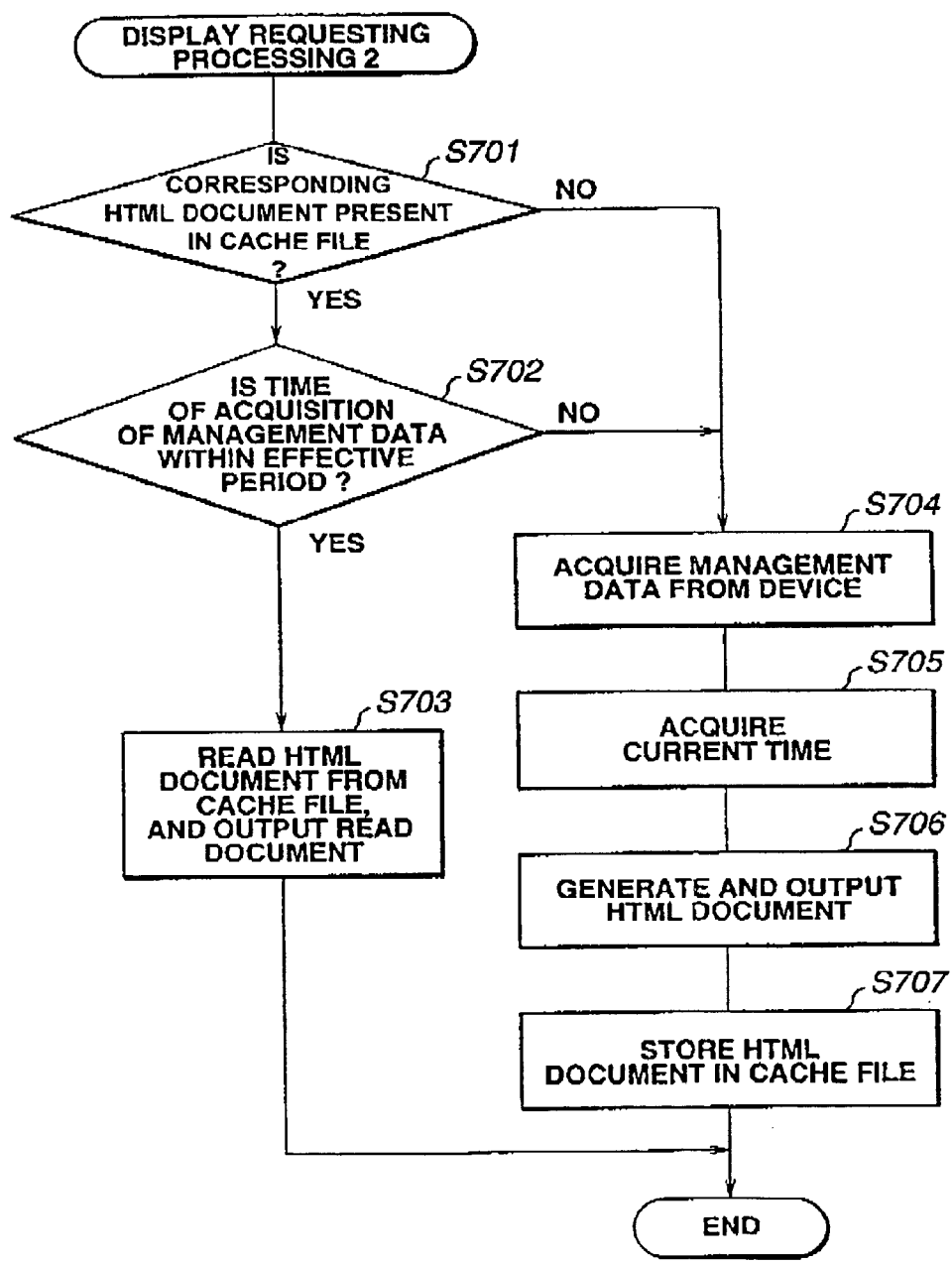
FIG. 7 is a flowchart when management data is preserved in a form after being converted into information for display in that embodiment.

FIG. 7 is a flowchart illustrating the processing of generating an HTML document for displaying network-device management data in response to a request from the WWW browser by the network-device management program, when the generated HTML document is preserved on the hard disk as the cache file 414.

In step S701, it is determined if the HTML document for a page requested to be displayed is present in the cache. If the result of the determination in step S701 is affirmative, the process proceeds to step S702. If the result of the determination in step S701 is negative, the process proceeds to step S704.

In step S702, data relating to the acquisition time of management data for the HTML document within the cache file (data relating to the generation time of the HTML document may be used assuming that the generation time of the HTML document is the acquisition time of the management data) is compared with the system time (the current time) of the WWW server. When the management data is acquired within a specific period before the current time, i.e., is relatively new information, the process proceeds to step S703. When the management data is not acquired within the specific period, i.e., old information, the process proceeds to step S704.

The specific period, i.e., an effective period for data preserved in the cache file 414, may be determined so as to be inherent in the system of the network-device management program, or may be set by the user, for example, according to a system setting page of the network-device management program.

In step S703, the HTML document for a page requested to be displayed is read from the cache file and is output.

In step S704, Get-request and Get-next-request commands are transmitted to the concerned network device, and a Get-response command is received. Then, management data of the network device is acquired via the network. Although not illustrated in FIG. 7, when a Get-response command expected for the Get-request and Get-next-request commands could not be received, appropriate error recovery processing, for example, retransmission of commands, is, of course, performed. Usually, a network device is assigned in the form of a network address or the like as a CGI parameter.

In step S705, the system time data (the time of acquisition of the management data) of the WWW server when the processing of the above-described step S704 has been completed is acquired.

In step S706, using the management data acquired in the above-described step S704 and the management-data acquisition time acquired in the above-described step S705, an HTML document (in a form capable of being displayed on the WWW browser) is generated and output.

In step S707, the HTML document generated in the above-described step S706 is preserved as a cache file, and the processing is terminated.

In the above-described description with reference to FIG. 7, the management-data acquisition time is compared with the current time, and it is determined if the acquired management data is a document within an effective period. However, the management-data acquisition time may be obtained by reading data contained within the HTML document, or a file for managing the time may be formed and used separately from the HTML document.

In the flowchart shown in FIG. 7, after generating and outputting the HTML document in steps S706 and S707, the HTML document is preserved. However, a configuration may, of course, be adopted in which after generating and preserving the HTML document, the HTML document is read and output.

When preserving data in the cache, the data is preferably preserved in the form of an HTML document or as the value of a template variable depending on the type of information for display. For example, when it is necessary to frequently change management data within information for display, the data may be preserved as the value of a template variable, and when it is unnecessary to frequently change the management data, the data may be preserved in the form of an HTML document.

Figure 8:
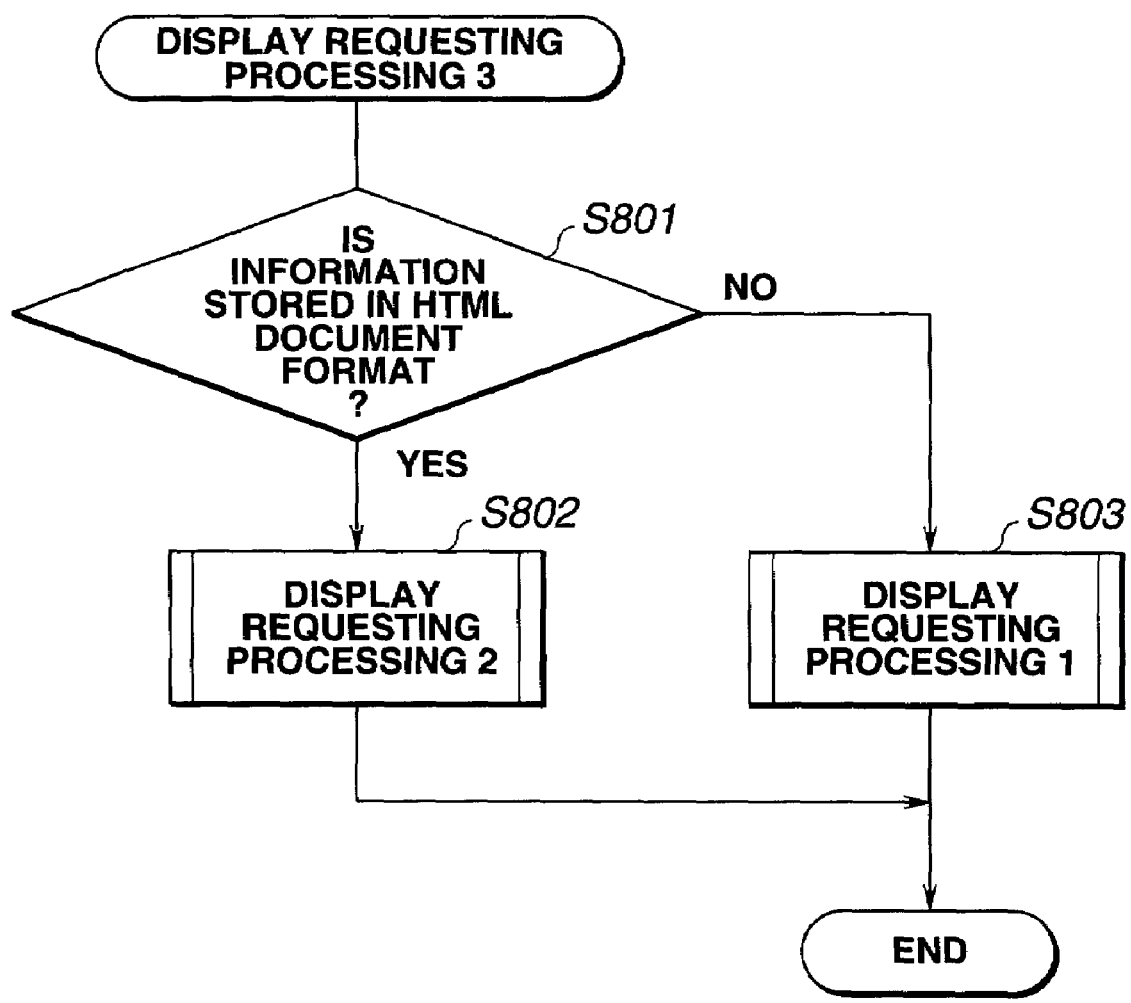
FIG. 8 is a flowchart when the form of preserving management data can be changed according to information for display in that embodiment.
Figure 9:
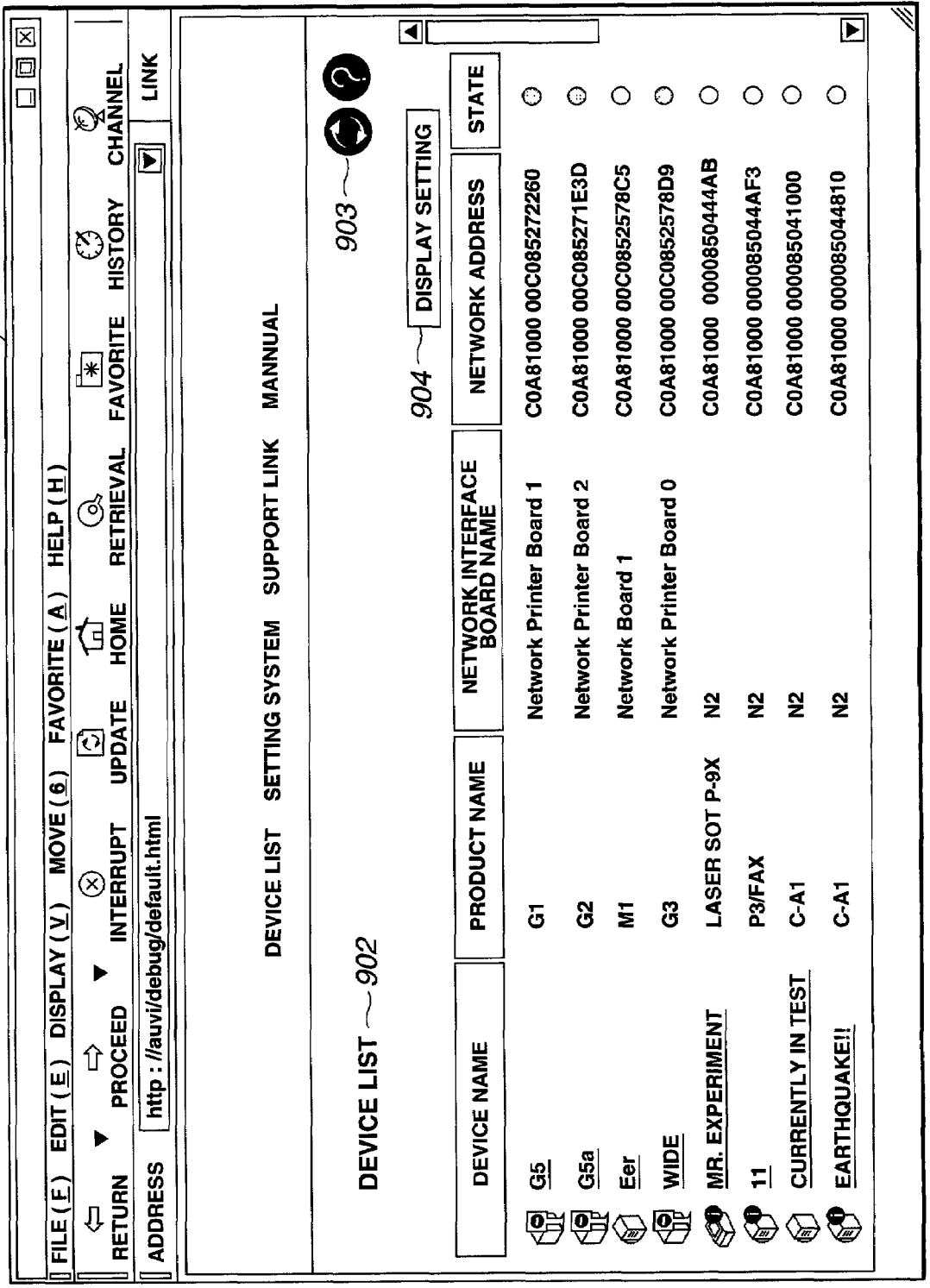
FIG. 9 is a diagram illustrating an example of display of a device list in which a summary of network devices to be managed that are connected to a network is displayed.
Figure 10:
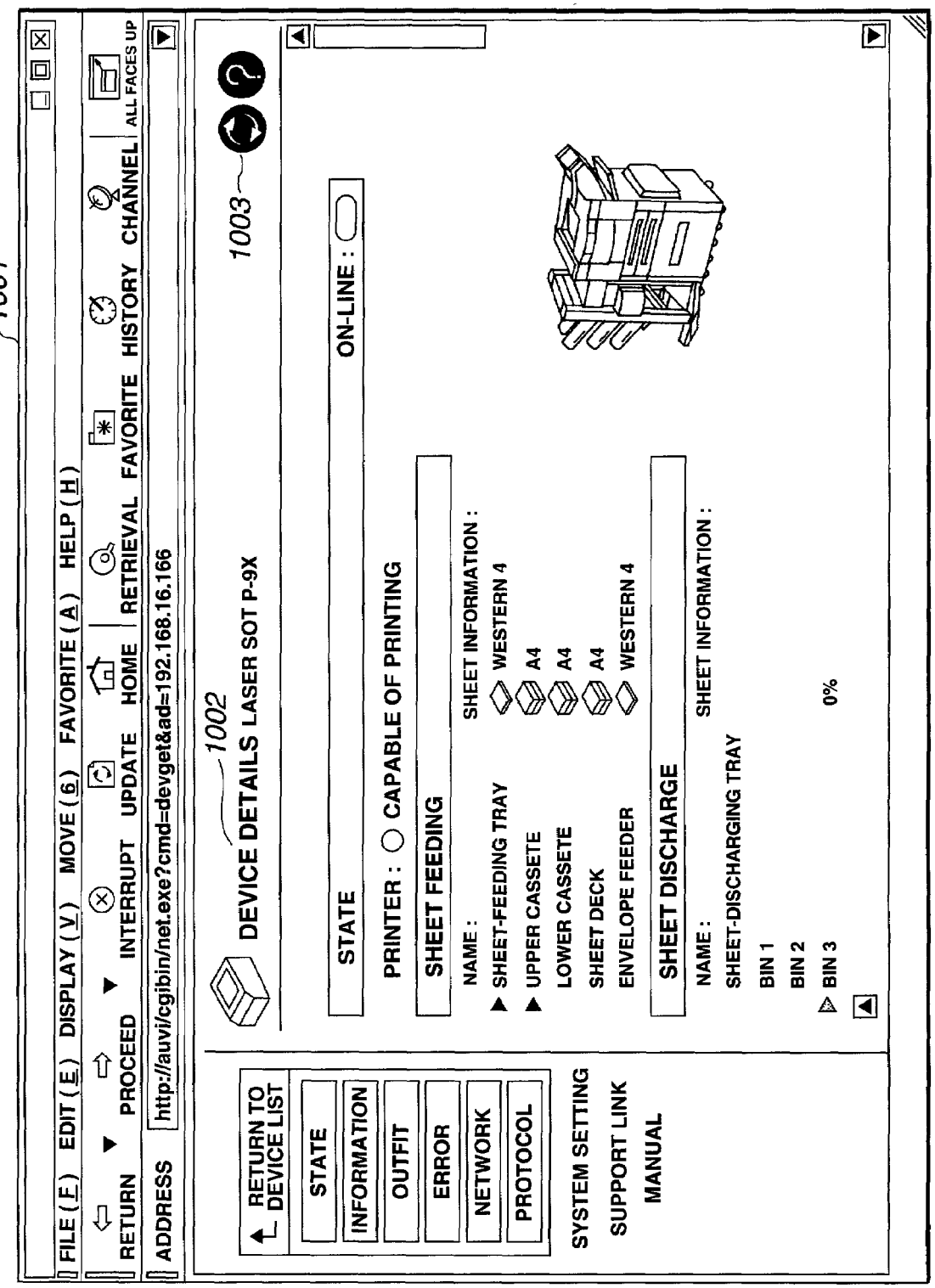
FIG. 10 is a diagram illustrating an example of display of the details of a network device, in which further detailed information of the device is displayed.

FIG. 8 is a flowchart in which either one of the processing shown in FIGS. 5 and 6 and the processing shown in FIG. 7 is selected depending on information to be displayed.

In step S801, it is determined if information for display (an HTML document is a type of information for display) requested to be displayed is to be preserved in the form of an HTML document in the cache. If the result of the determination in step S801 is affirmative, the process proceeds to step S802. If the result of the determination in step S801 is negative, the process proceeds to step S803.

In step S802, the display requesting processing shown in FIG. 7 is executed, and the process is then terminated. In step S803, the display requesting processing shown in FIGS. 5 and 6 is executed, and the process is then terminated.

Although a description has been provided with reference to the flowcharts shown in FIGS. 5 through 8, any other time may be used as the acquisition-time data, provided that the used time can be dealt with as a time substantially the same as the time of acquisition of management data. For example, when management data is acquired and immediately preserved as in the case of FIG. 5, the time of preservation may be dealt with as the time of acquisition without causing any problem. When management data is acquired and information for display is immediately generated and preserved as in the case of FIG. 7, the time of preservation of the information for display may be dealt with as the time of acquisition without causing any problem.

Acquisition-time data may be acquired/preserved for a plurality of management data (a group of management data) within information for display (for example, an HTML document), for each management data within information for display, or for each information for display.

When determining whether or not management data or information for display preserved in the cache is old, acquisition-time data preserved in order to be used for information for display may be used. Alternatively, time data which can be substantially dealt with as the acquisition time may be preserved as different data to be used for the determination.

In the aboved-described embodiment, generated/preserved information for display may be in the form of an HTML documentation, or in any other form capable of being displayed on the WWW browser (an HTML format, a text format, an image format or the like).

In the preferred embodiment, it is assumed that the network-device management program is operated on the WWW server and information for display is displayed on the WWW browser. However, the present invention may, of course, be used in order that a network-device management program in a server/client system other than the WWW system, a network-device management program using a cache, or the like notifies the user of when managment data displayed on a display picture surface has been acquired.

In the above-described embodiment, in order to indicate whether or not management data preserved in a cache module within a network-device management program is old, time data is displayed in information for display. However, when the network-device management program side does not have a cache, and a display program (such as a WWW browser or the like) at the client side has a mechanism for preserving information for display, time data may be substantially contained in information for display in order to indicate when management data contained in information for display has been acquired. In this case, also, as in the above-described embodiment, it is possible to prevent the user from executing an unnecessary "update to latest information" command, reduce the load of the network device or the network-device management program, and reduce traffic in the network.

Figure 11:
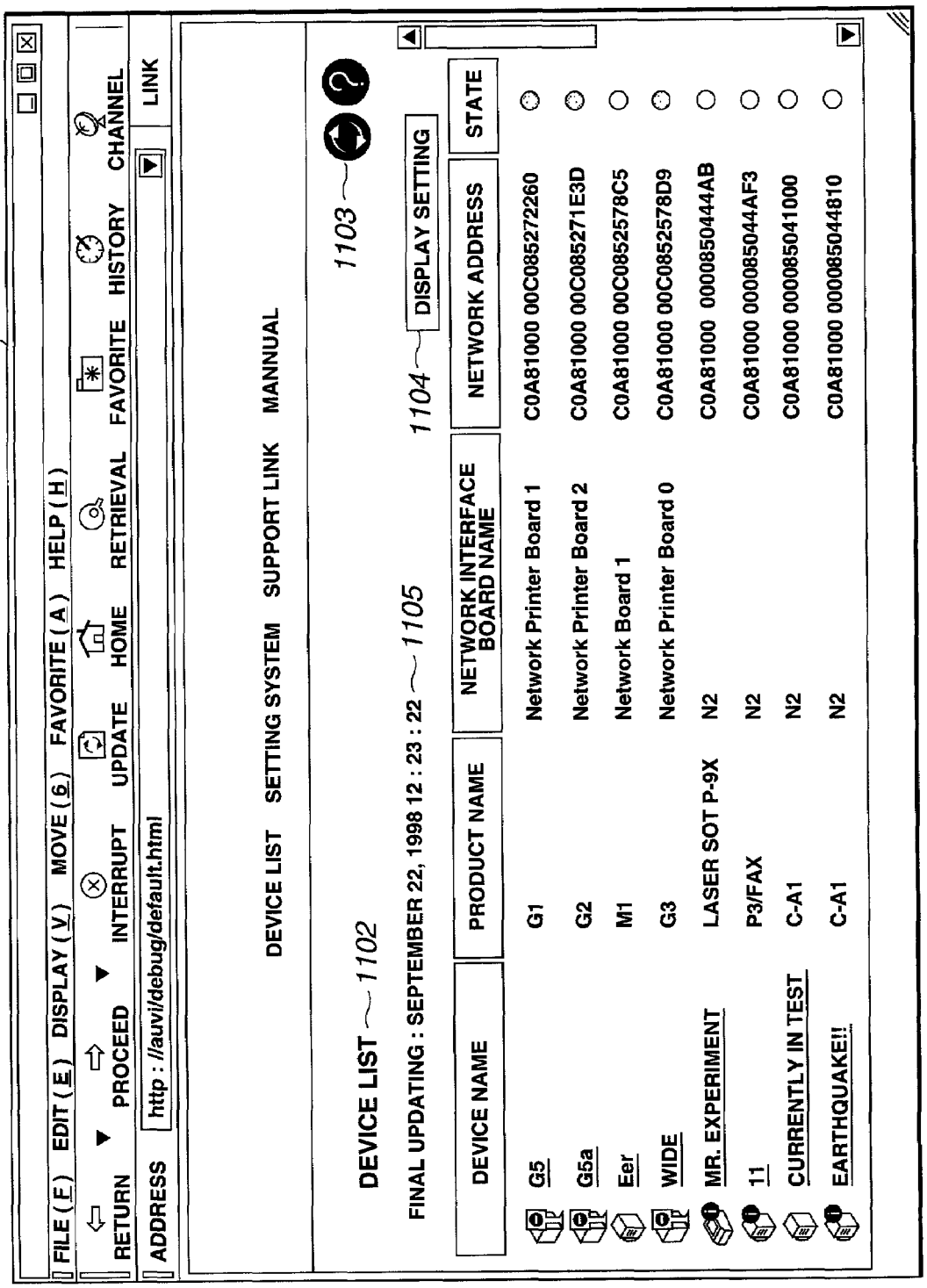
FIG. 11 is a diagram illustrating an example of display of a device list generated by a network-device management program in the embodiment of FIG. 3.
Figure 12:
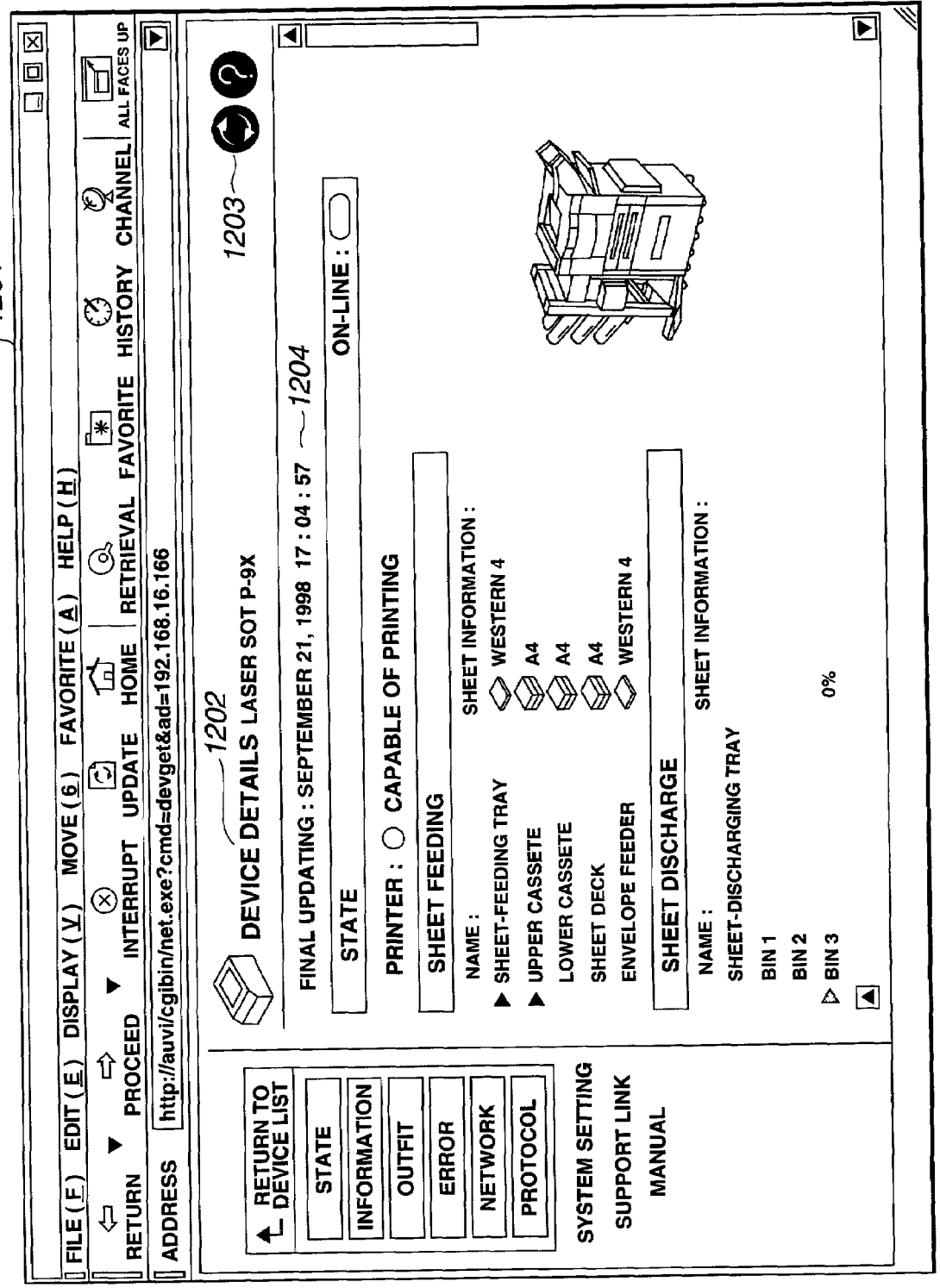
FIG. 12 is a diagram illustrating an example of display of the details of a device generated by the network-device management program in that embodiment.

FIG. 11 illustrates an example of display of a device list generated by the network-device management program in this embodiment. FIG. 12 illustrates an example of display of device details generated by the network-device management program in this embodiment.

In FIG. 11, reference numeral 1105 represents the time of acquisition of management data from each network device subjected to summary display by the network-device management program. In FIG. 12, reference numeral 1204 represents the time of acquisition of detailed information of management data from the concerned network device by the network-device management program.

The user can confirm how new displayed management data is by confirming the displayed time. The user can also execute a command for updating information to the latest information whenever necessary (by depressing a button 1103 or 1203).

The network-device management program of the embodiment may also be executed by a PC having a configuration equivalent to the configuration of the PC 150 shown in FIG. 5 according to a program installed from the outside. In such a case, the objects of the present invention may, of course, be achieved by supplying a system or an apparatus with a storage medium, such as a storage medium 1402 shown in FIG. 14, storing program codes of software for realizing the functions of the above-described embodiment, and reading and executing the program codes stored in the storage medium by means of a computer (or a CPU or an MPU (microprocessor unit)) of the system or the apparatus.

In such a case, the program codes themselves read from the storage medium realize the functions of the above-described embodiment, so that the storage medium storing the program codes constitutes the present invention.

For example, a magnetic disk, such as a floppy disk, a hard disk or the like, an optical disk, a magnetooptical disk, a CD(compact disc)-ROM, a CD-R (recordable), a DVD (digital versatile disc)-ROM, a DVD-RAM, a magnetic tape, a memory card, a ROM or the like may be used as the storage medium for supplying the program codes.

The present invention may, of course, be applied to a case in which a program is distributed from storage medium storing program codes of software for realizing the functions of the above-described embodiment via a communication line for PC communication or the like.

Figure 13:
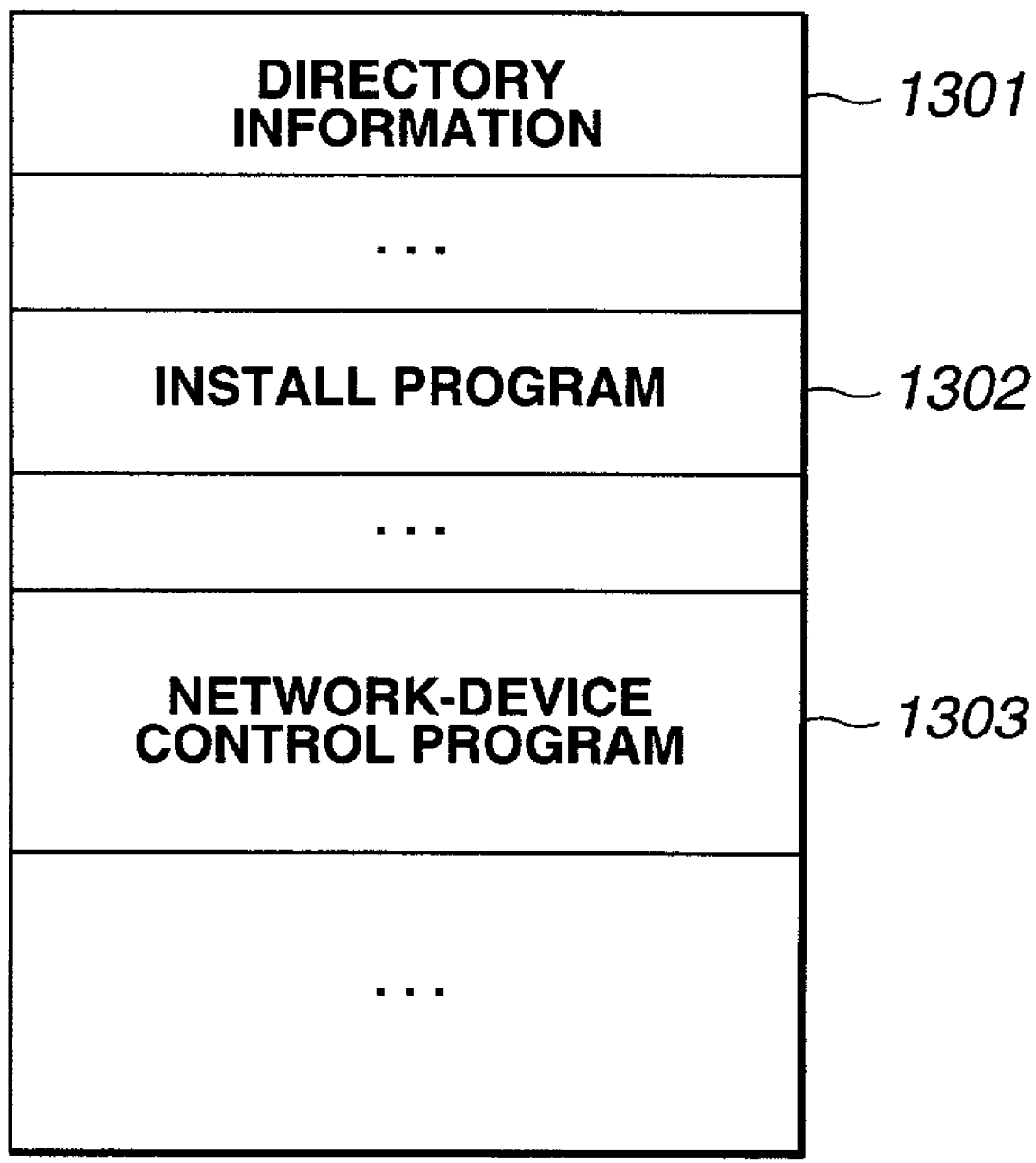
FIG. 13 is a diagram illustrating an image of a memory map of a storage medium storing the network-device management program in that embodiment.

FIG. 13 is a diagram illustrating a memory map of a storage medium, such as a CD-ROM or the like. In FIG. 13, a region 1301 stores directory information which indicates the positions of a region 1302 storing an install program and a region storing a network-device management program 1303. When the network-device management program of the embodiment is installed in a PC equivalent to the PC 150 shown in FIG. 3, first, the install program stored in the region 1302 is loaded into the PC, and is executed by the CPU 301. Then, the install program executed by the CPU 301 reads the network-device management program from the region 1303 storing the network-device management program, and stores the read program onto the hard disk 311.

When the present invention is applied to the above-described storage medium, program codes corresponding to the above-described flowcharts are stored in the storage medium. Briefly speaking, each module as that shown in the example of the module configuration of FIG. 4 is stored in the storage medium.

Figure 14:
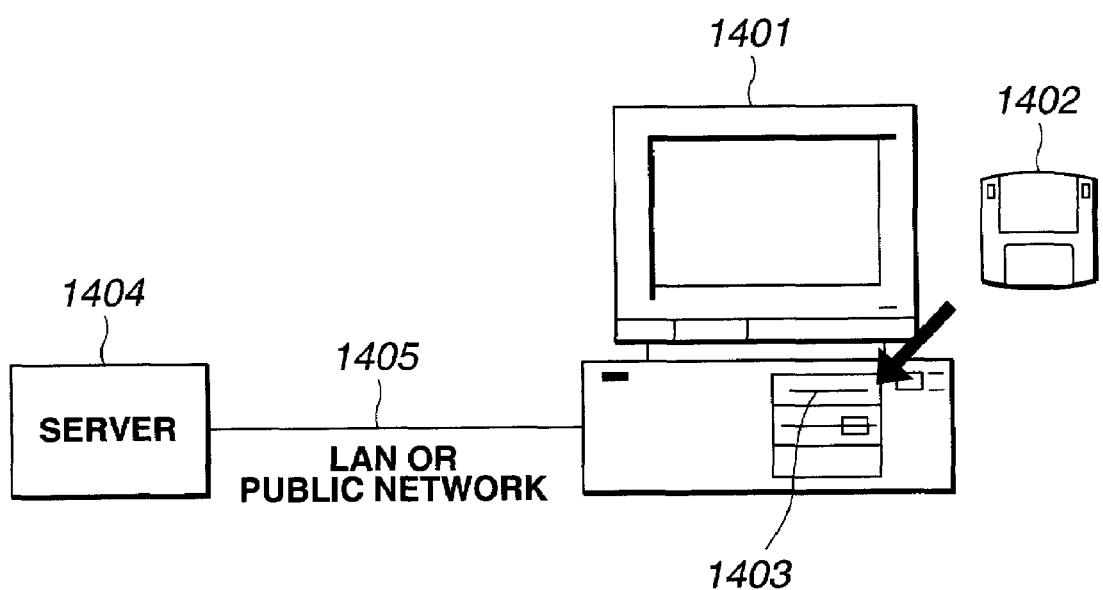
FIG. 14 is a diagram illustrating a storage medium storing program codes, and a transmission apparatus for transmitting the program codes.

The objects of the present invention may, of course, be applied to a case in which, as shown in FIG. 14, a transmission apparatus 1404, such as an HTTP (Hyper Text Transfer Protocol) server, an FTP (File Transfer Protocol) server or the like, transmits program codes of software for realizing the various functions of the above-described embodiment, a computer (or a CPU or an MPU) of the system or the apparatus receives the transmitted program codes via a network, a public network, radio transmission or the like represented by reference numeral 1405, the computer executes the program codes.

In such a case, the program codes themselves transmitted from the transmission apparatus realize the functions of the above-described embodiment, so that the transmission apparatus for ttransmitting the program codes constitutes the present invention.

The present invention may be applied to a system or a composite apparatus comprising a plurality of apparatuses (such as a host computer, an interface apparatus, a reader and the like) or to an apparatus comprising a single unit.

The present invention may be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may also be applied to a case in which, after writing program codes read from a storage medium into a memory provided in a function expanding board inserted in a computer or in a function expanding unit connected to the computer, a CPU or the like provided in the function expanding board or the function expanding unit performs a part or the entirety of actual processing, and the functions of the above-described embodiment are realized by the processing.

As described above, accoring to the present invention, it is possible to display time data substantially indicating the time of acquisition of device information in information for display for displaying the device information (management data).

According to an instruction from the client side (user side), the information for display can be displayed at the client side.

By allowing preservation of device information, it is possible to reduce the number of acquisition of device information.

It is also possible to preserve device information in a form before conversion into information for display or in a form after conversion into information for display, so as to be convenient for processing.

By allowing automatic change of the form of preservation depending on the type of device information, the efficiency in display processing can be improved.

By automatically determining whether or not preserved device information is old, it is possible to display device information acquired within a predetermined period.

In the determination, by preserving time data to be used as a criterion for the determination separately from the acquired time data, it is possible to efficiently perform the determination.

If the determination is performed based on the above-described acquisition-time data without preserving time data as a criterion for the determination, it is possible to reduce the capacity of a memory for preserving the data.

Since the substantial time of acquisition of device information may be used as the acquisition time if there is little differece between the two types of times, time acquisition processing can be appropriately performed.

By generating and transmitting information for display when a command from a client has been received, it is possible to reduce the load of the management program and the network device.

By peforming transmission/reception with the client via the WWW server program, the client side need not newly introduce a program for displaying device information if an existent WWW browser has been introduced.

By thus indicating the time of acquisition of device information from a network device, it is possible to reduce the number of operations of transmitting a command to cause the network-device management program to acquire device information from a client (user), and efficiently preserve management data. Hence, it is possible to reduce the load on the network traffic and the network-device management program, the load on the network device, and the like.

The individual components shown in outline or designated by blocks in the drawings are all well known in the network-device management apparatus and method, recording medium, and transmission apparatus arts and their specific construction and operation are not critical to the operation or the best mode for carrying out the invention.

While the present invention has been desribed with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretations so as to encompass all such modifications and equivalent structures and functions.

What is claimed is:

1. A network-device management method for managing a network device via a network comprising:
    a device information acquisition step of acquiring device information relating to the network device from the network device via the network;
    a time acquisition step of acquiring time data indicating a time at which device information is acquired by acquiring step, the time data being acquired in response to the device information being acquired via the network from the network device in said device information acquisition step;
    a generating step of generating display data regarding the acquired device information and the acquired time data in a form capable of being displayed on a display, the generated display data including the acquired device information and the acquired time data; and
    a transmission step of transmitting the display data generated in said generating step to a host computer via the network, wherein the acquired device and the acquired time data are displayed on the host computer.

2. A method according to claim 1, further comprising a storage step of storing the acquired device information and the acquired time data in a memory, or storing the generated display data in the memory.

3. A method according to claim 2, further comprising a determination step of determining whether in said storage step the acquired device information and the acquired time data are stored in the memory, or the generated display data is stored in the memory.

4. A method according to claim 1, further comprising a storage step of storing the acquired device information and the acquired time data in a memory, and a discrimination step of discriminating whether or not the device information stored in the memory is old, wherein, when it is discriminated in said discrimination step that the stored device information is not old, the display data including the acquired device information and the acquired time data stored in the memory is generated in said generating step.

5. A method according to claim 4, wherein, when it is discriminated in said discrimination step that the device information stored in the memory is old, the device information is acquired in said device information acquisition step, the time data is acquired in said time acquisition step, and the display data including the acquired device information and the acquired time data is generated in said generating step.

6. A method according to claim 4, wherein said discrimination step discriminates whether or not the stored device information is old on the basis of the acquired time data stored in the memory.

7. A method according to claim 1, further comprising a storage step of storing the generated display data in a memory, and a discrimination step of discriminating whether or not the generated display data stored in the memory is old, wherein, when it is discriminated in said discrimination step that the generated display data is not old, the generated display data stored in the memory is transmitted to a host computer, and when it is discriminated in said discrimination step that the generated display data is old, the display data is generated in said generating step and the generated display data is transmitted to the host computer.

8. A method according to claim 1, wherein the acquired time data indicates at least one of (1) a time when the device information has been acquired from the network device, (2) a time when the acquired device information has been stored in a memory, and (3) a time when the display data has been generated in said generating step.

9. A method according to claim 1, further comprising a reception step of receiving a command from the host computer, wherein, the generated display data is transmitted in said transmission step in response to the command.

10. A method according to claim 1, wherein the generated display data is generated in a display format which a web browser can display.

11. A method according to claim 1, wherein a plurality of items of device information are acquired in said device information acquisition step and the time data is acquired for each of the respective plurality of items in said time acquisition step.

12. A method according to claim 1, wherein said device information acquisition step is performed using an SNMP (Simple Network Management Protocol), and wherein the device information is MIB (Management Information Base) information of the network device.

13. A network-device management apparatus for managing a network device via a network, said apparatus comprising:
    device information acquisition means for acquiring device information relating to the network device from the network device via the network;
    time acquisition means for acquiring time data indicating a time at which device information is acquired by acquiring step, the time data being acquired in response to the device information being acquired via the network from the network device by the device information acquisition means;
    generating means for generating display data regarding the acquired device information and the acquired time data in a form capable of being displayed on a display, the generated display data including the acquired device information and the acquired time data; and
    transmission means for transmitting the display data generated in said generating step to a host computer via the network, wherein the acquired device and the acquired time data are displayed on the host computer.

14. An apparatus according to claim 13, further comprising transmission means for transmitting the display data generated by the generating means to a host computer connected to the network, wherein the host computer displays the acquired device information and the acquired time data.

15. An apparatus according to claim 14, further comprising reception means for receiving a command from the host computer, wherein, the generated display data is transmitted by the transmission means in response to the command.

16. An apparatus according to claim 13, further comprising storage means that stores the acquired device information and the acquired time data in a memory, or that stores the generated display data in the memory.

17. An apparatus according to claim 16, further comprising determination means for determining whether said storage means stores the acquired device information and the acquired time data in the memory, or stores the generated display data in the memory.

18. An apparatus according to claim 13, further comprising storage means that stores the acquired device information and the acquired time data in a memory, and discrimination means for discriminating whether or not the device information stored in said memory is old, wherein, when it is discriminated by the discrimination means that the stored device information is not old, the display data including the acquired device information and the acquired time data stored in the memory is generated by the generating means.

19. An apparatus according to claim 18, wherein, when it is discriminated by the discrimination means that the stored device information is old, the device information is acquired by said device information acquisition means, the time data is acquired by the time acquisition means, and the display data including the acquired device information and the acquired time data is generated by the generating means.

20. An apparatus according to claim 18, wherein said discrimination means discriminates whether or not the stored device information is old on the basis of the time data stored in the memory.

21. An apparatus according to claim 13, further comprising a storage means which stores the generated display data in a memory, and a discrimination means that discriminates whether or not the generated display data stored in the memory is old, wherein, when said discrimination means has discriminated that the generated display data is not old, the generated display data stored in the memory is transmitted to a host computer, and when said discrimination means has discriminated that the generated display data is old, the display data is generated by said generating means and the generated display data is transmitted to the host computer.

22. An apparatus according to claim 13, wherein the acquired time data indicates at least one of (1) a time when the device information has been acquired from the network device, (2) a time when the device information has been stored in a memory, and (3) a time when the display data has been generated by the generating means.

23. An apparatus according to claim 13, wherein the generated display data is generated in a display format which a web browser can display.

24. An apparatus according to claim 13, wherein a plurality of items of device information are acquired by the device information acquisition means and the time data is acquired for each of the respective plurality of items by the time acquisition means.

25. An apparatus according to claim 13, wherein said device information acquisition means acquires the device information using an SNMP (Simple Network Management Protocol), and wherein the device information is MIB (Management Information Base) information of the network device.

26. A network-device management system including a network-device management apparatus for managing a network device via a network, and an information processing apparatus capable of displaying device information relating to the network device managed by the network-device management apparatus, said network-device management apparatus comprising:
  reception means for receiving a command from said information processing apparatus to acquire device information of the network device;
  device information acquisition means for acquiring the device information relating to the network device from the network device via the network;
  time acquisition means for acquiring time data indicating a time at which device information is acquired by acquiring step, the time data being acquired in response to the device information being acquired via the network from the network device by the device information acquisition means;
  generating means for generating display data regarding the acquired device information and the acquired time data in a form capable of being displayed on a display, the generated display data including the acquired device information and the acquired time data; and
  transmission means for transmitting the acquired device information and the acquired time data to said information processing apparatus,
  and said information processing apparatus comprising:
  command transmission means for transmitting the command for acquiring the device information to said network-device management apparatus; and
  information reception means for receiving the acquired device information and the acquired time data from the network-device management apparatus.

27. A computer-readable recording medium storing a network-device management program for managing a network device via a network, said network-device management program comprising:
  a device information acquisition step of acquiring device information relating to the network device from the network device via the network;
  a time acquisition step of acquiring time data indicating a time at which device information is acquired by acquiring step, the time data being acquired in response to the device information being acquired via the network from the network device in the device information acquisition step;
  a generating step of generating display data regarding the acquired device information and the acquired time data in a form capable of being displayed on a display, the generated display data including the acquired device information and the acquired time data; and
  a transmission step of transmitting the display data generated in said generating step to a host computer via the network, wherein the acquired device and the acquired time data are displayed on the host computer.

28. A network-device management program stored on a computer-readable medium for managing a network device via a network, said network-device management program comprising the steps of:
  a device information acquisition step of acquiring device information relating to the network device from the network device via the network;
  a time acquisition step of acquiring time data indicating a time at which device information is acquired by acquiring step, the time data being acquired in response to the device information being acquired via the network from the network device in the device information acquisition step;
  a generating step of generating display data regarding the acquired device information and the acquired time data in a form capable of being displayed on a display, the generated display data including the acquired device information and the acquired time data; and
  a transmission step of transmitting the display data generated in said generating step to a host computer via the network, wherein the acquired device and the acquired time data are displayed on the host computer.

* * * * *

UNITED STATES PATENT AND TRADEMARK OFFICE
CERTIFICATE OF CORRECTION

| | |
|---|---|
| PATENT NO. | : 7,028,081 B2 |
| APPLICATION NO. | : 09/422102 |
| DATED | : April 11, 2006 |
| INVENTOR(S) | : Masanori Kawashima |

It is certified that error appears in the above-identified patent and that said Letters Patent is hereby corrected as shown below:

TITLE PAGE:

Item (56) References Cited OTHER PUBLICATIONS (page two),
"Grrison," should read -- Garrison, --; and
"Interactive Generator of Virtual Baroque Dances ....", and "Creating and Rendering Image-Based Visual Hulls ....", (second occurrences) should be deleted.

COLUMN 1:
Line 52, "PC 204" should read -- PC 104 --.

COLUMN 2:
Line 18, "package)." should read -- package. --; and
Line 51, "modem/transponders 130, 130b" should read -- modem/transponders 130a, 130b --.

COLUMN 9:
Line 46, "and" should read -- an --.

COLUMN 11:
Line 15, "step s602." should read -- step S602. --; and
Line 50, "prevserved" should read -- preserved --.

COLUMN 15:
Line 15, "ttransmitting" should read -- transmitting --;
Line 37, "accoring" should read -- according --; and
Line 46, "acquisition" should read -- acquisitions --.

COLUMN 16:
Line 26, "desribed" should read -- described --; and
Line 33, "interpretations" should read -- interpretation --.

COLUMN 17: Claim 9
Line 40, "wherein," should read -- wherein --.

UNITED STATES PATENT AND TRADEMARK OFFICE
CERTIFICATE OF CORRECTION

PATENT NO. : 7,028,081 B2
APPLICATION NO. : 09/422102
DATED : April 11, 2006
INVENTOR(S) : Masanori Kawashima It is certified that error appears in the above-identified patent and that said Letters Patent is hereby corrected as shown below:

COLUMN 18: Claim 15
Line 18, "wherein," should read -- wherein --.

Signed and Sealed this

Twentieth Day of March, 2007

JON W. DUDAS
*Director of the United States Patent and Trademark Office*